No. 729,066. PATENTED MAY 26, 1903.
F. HANSON.
HARROW.
APPLICATION FILED MAR. 20, 1902.
NO MODEL.
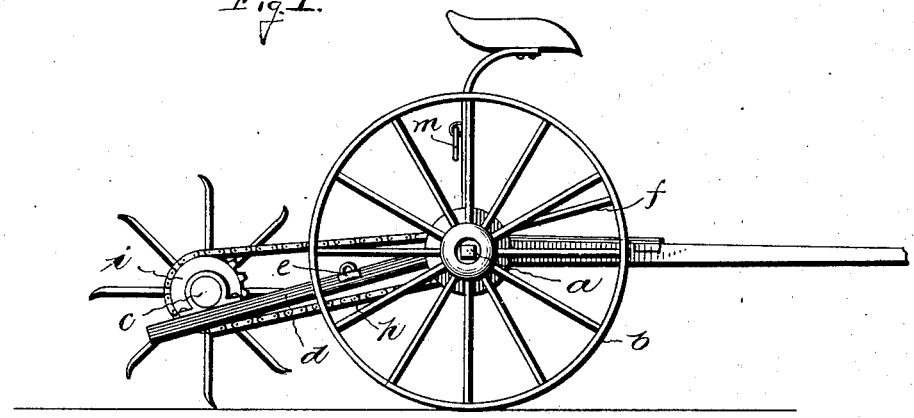

No. 729,066. Patented May 26, 1903.

UNITED STATES PATENT OFFICE.

FREEMAN HANSON, OF HOLLIS CENTER, MAINE, ASSIGNOR OF ONE-HALF TO CHARLES B. HARMON, OF BIDDEFORD, MAINE.

HARROW.

SPECIFICATION forming part of Letters Patent No. 729,066, dated May 26, 1903.

Application filed March 20, 1902. Serial No. 99,166. (No model.)

*To all whom it may concern:*

Be it known that I, FREEMAN HANSON, a citizen of the United States, residing at Hollis Center, in the county of York and State of Maine, have invented certain new and useful Improvements in Harrows, of which the following is a specification.

My invention relates to agricultural implements of that class commonly designated "harrows;" and the object thereof is to provide an implement capable of performing to a maximum degree the required work which will avoid the objection so common in this type of devices in that it will automatically free and keep clean and unobstructed its working teeth.

To this end the invention includes a harrow comprising a main axle having supporting or traction wheels secured to its ends and an auxiliary axle rotated from the main axle by interposed back gearing, the latter axle carrying a plurality of sets of radially-arranged teeth.

It also includes means for supporting the auxiliary axle and teeth when the same are thrown out of use.

The invention further includes the details of construction, as will be hereinafter described, and particularly pointed out in the claim.

In the accompanying drawings, which illustrate the preferred embodiment of my invention, Figure 1 shows the implement in side elevation, and Fig. 2 is a plan view of the same.

As indicated in the drawings, the main axle $a$ has the supporting or traction wheels $b$ journaled on the ends thereof and connected thereto by pawl-and-ratchet mechanism, so that the axle and wheels will turn in unison as the machine is drawn forward, but the wheels will turn alone as the machine is backed.

The auxiliary shaft $c$ is journaled in the ends of corresponding arms $d$, swiveled at their front ends upon the axle $a$ and braced apart by a frame member $e$, extending between the same intermediate of their ends. The shaft is provided with a plurality of hubs or annular enlargements $c'$, disposed at intervals along its length, from each of which two sets of radially-projecting harrow-teeth extend, and this shaft is rotated as the implement is drawn forwardly by being geared to the shaft $a$.

In the operation of the implement herein presented it is intended that the harrow-teeth drag in the ground, as in the common form of fixed-tooth implement, to break the clods and only rise at intervals, so that said teeth will automatically clear or clean themselves. This action of the harrow-teeth is rendered more effective in the harrowing of the soil by reason of the peculiar deflection or disposition of the points or tips of the individual teeth. As illustrated in the drawings, each harrow-tooth is provided at its outer end or tip with an angularly-deflected point $p$, which point is deflected backwardly with reference to the direction of rotation of the shaft carrying the teeth, thus insuring a gradual and easy entrance of the points into the soil, while at the same time securing a thorough harrowing action before the points pass out of the soil. To obtain the dragging action, it is necessary that the shaft $c$ be very slowly rotated, and this is obtained by interposing what is known as "back" gearing between shafts $a$ and $c$. The gearing illustrated in the accompanying drawings comprises corresponding sprocket-wheels secured to the ends of the axle $a$ in proximity to arms $d$ and relatively larger sprocket-wheels $i$, secured upon shaft $c$, and sprocket-chains $h$, passing over each pair of wheels. The relative size of each pair of sprockets is such that the shaft $a$ will rotate four times as fast as the shaft $c$. When the harrow-teeth are thrown out of use and the machine is to be moved, as when the implement is being drawn to and from the field, it is desirable to hold the teeth clear of the ground and at the same time relieve the weight thereof from the shaft of the machine. To obtain this result, a hook $m$ is preferably provided on the seat-standard, which engages with the brace-bar $e$ and maintains the harrow-frame proper in elevated position, with the shaft $c$ substantially directly over the axle $a$, and consequently the weight of said frame is carried by the latter, and thereby there is no tendency to tilt or lift the shafts of the machine.

In order that the cultivator-frame may be raised by the operator without the latter leaving his seat, I have provided a lever $f$, fulcrumed intermediately of its length upon the axle $a$ and bolted at its rear end to the cross-bar $e$ of the frame. The free end of this lever is broadened to provide a tread portion.

Having thus described my invention, what is claimed as new, and desired to be secured by Letters Patent, is—

In combination with the driving-axle, wheels rotating therewith, beams $d$ provided with straps fastened to their ends, said straps having swiveled connection with the axle, a counter-shaft journaled in suitable bearings on said beams, harrow-teeth fixed to rotate with said shaft, geared connections between the driving-axle and counter-shaft, a cross-bar connecting said beams and intermediate said shaft and axle, and a lever fixed at one end to said cross-bar, and fulcrumed at its middle portion over a collar upon the driving-axle, as set forth.

In testimony whereof I affix my signature in presence of two witnesses.

FREEMAN HANSON.

Witnesses:
J. E. ETCHELLS,
CHAS. A. MOODY.